(12) United States Patent
Douglas et al.

(10) Patent No.: US 12,304,751 B2
(45) Date of Patent: May 20, 2025

(54) BIDIRECTIONAL AIR CONVEYOR DEVICE FOR MATERIAL SORTING AND OTHER APPLICATIONS

(71) Applicant: AMP Robotics Corporation, Louisville, CO (US)

(72) Inventors: Cameron D. Douglas, Boulder, CO (US); Mark Baybutt, Superior, CO (US); Matanya B. Horowitz, Golden, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

(21) Appl. No.: 18/355,281

(22) Filed: Jul. 19, 2023

(65) Prior Publication Data

US 2023/0365352 A1 Nov. 16, 2023

Related U.S. Application Data

(63) Continuation of application No. 17/122,917, filed on Dec. 15, 2020, now Pat. No. 11,753,257.

(60) Provisional application No. 62/948,401, filed on Dec. 16, 2019.

(51) Int. Cl.
*B07C 5/36* (2006.01)
*B07C 5/342* (2006.01)
*B65G 47/91* (2006.01)

(52) U.S. Cl.
CPC ............ *B65G 47/917* (2013.01); *B07C 5/342* (2013.01); *B07C 5/368* (2013.01); *B65G 2203/0233* (2013.01); *B65G 2203/041* (2013.01)

(58) Field of Classification Search
CPC ......... B07C 5/363; B07C 5/367; B07C 5/368; B07C 5/342; B25J 15/065; B25J 15/0658; B25J 15/0616; B65G 47/917; B65G 17/918
See application file for complete search history.

(56) References Cited

U.S. PATENT DOCUMENTS

| 3,774,778 A | 11/1973 | Flaig |
| 4,648,588 A | 3/1987 | Carrell |
| 4,732,513 A | 3/1988 | Lenhart |

(Continued)

FOREIGN PATENT DOCUMENTS

| CA | 3071944 | 3/2019 |
| DE | 2422785 | 1/1975 |

(Continued)

*Primary Examiner* — Patrick H Mackey
(74) *Attorney, Agent, or Firm* — Van Pelt, Yi & James LLP

(57) ABSTRACT

A bidirectional air conveyor device is disclosed, including: a housing that includes an intake port and an outlet port; a first air input port; a first airflow generator defined within the housing, wherein the first airflow generator is coupled to the first air input port; a second air input port; a second airflow generator defined within the housing, wherein the second airflow generator is coupled to the second air input port; wherein the first airflow generator is configured to cause a first airflow to enter the intake port and exit the outlet port in response to a first supply of air to the first air input port; and wherein the second airflow generator is configured to cause a second airflow to enter the outlet port and exit the intake port in response to a second supply of air to the second air input port.

20 Claims, 9 Drawing Sheets

(56) References Cited

U.S. PATENT DOCUMENTS

| | | | |
|---|---|---|---|
| 5,037,245 A | 8/1991 | Smith | |
| 5,209,387 A | 5/1993 | Long | |
| 5,242,059 A * | 9/1993 | Low | B07C 5/362 |
| | | | 209/552 |
| 5,299,693 A | 4/1994 | Ubaldi | |
| 5,423,431 A | 6/1995 | Westin | |
| 5,628,409 A | 5/1997 | Thomas | |
| 5,636,887 A | 6/1997 | Petropoulos | |
| 5,865,487 A | 2/1999 | Gore | |
| 6,068,317 A | 5/2000 | Park | |
| 6,124,560 A * | 9/2000 | Roos | B07C 5/361 |
| | | | 209/587 |
| 6,244,640 B1 | 6/2001 | Le Bricquer | |
| 6,313,422 B1 | 11/2001 | Anibas | |
| 6,439,631 B1 | 8/2002 | Kress | |
| 6,979,032 B2 | 12/2005 | Damhuis | |
| 7,263,890 B2 | 9/2007 | Takahashi | |
| 8,615,123 B2 | 12/2013 | Dabic | |
| 8,777,284 B2 * | 7/2014 | Schaller | H01L 21/677 |
| | | | 294/185 |
| 8,855,818 B2 | 10/2014 | Hashimoto | |
| 8,892,148 B2 | 11/2014 | Bhaskaran | |
| 9,334,128 B2 | 5/2016 | Milhau | |
| 10,118,300 B2 | 11/2018 | Wagner | |
| 10,207,296 B2 | 2/2019 | Garcia | |
| 10,370,202 B2 | 8/2019 | Hukelmann | |
| 10,625,304 B2 | 4/2020 | Kumar | |
| 10,710,119 B2 | 7/2020 | Kumar | |
| 10,722,922 B2 | 7/2020 | Kumar | |
| 10,814,498 B2 * | 10/2020 | Wagner | B66C 1/02 |
| 11,458,635 B2 * | 10/2022 | Wicks | B25J 15/0038 |
| 11,465,008 B2 | 10/2022 | Draper | |
| 11,753,257 B2 * | 9/2023 | Douglas | B65G 47/918 |
| | | | 700/223 |
| 2006/0054774 A1 | 3/2006 | Yassour | |
| 2007/0278139 A1 | 12/2007 | Cowling | |
| 2009/0272624 A1 | 11/2009 | Edwards | |
| 2012/0116572 A1 | 5/2012 | Corak | |
| 2012/0319416 A1 | 12/2012 | Ellis | |
| 2013/0168301 A1 | 7/2013 | Dell Endice | |
| 2016/0136816 A1 | 5/2016 | Pistorino | |
| 2017/0232479 A1 | 8/2017 | Pietzka | |
| 2018/0186012 A1 | 7/2018 | Regan | |
| 2019/0070734 A1 | 3/2019 | Wertenberger | |
| 2019/0084012 A1 | 3/2019 | McCoy, Jr. | |
| 2019/0134827 A1 | 5/2019 | Wagner | |
| 2019/0374978 A1 * | 12/2019 | Borrell | B07C 5/367 |
| 2020/0290088 A1 | 9/2020 | Kumar | |
| 2020/0368786 A1 | 11/2020 | Kumar | |
| 2021/0061588 A1 | 3/2021 | Lukka | |
| 2021/0229133 A1 | 7/2021 | Kumar | |
| 2021/0346916 A1 | 11/2021 | Kumar | |
| 2022/0016675 A1 | 1/2022 | Kumar | |
| 2022/0023918 A1 | 1/2022 | Kumar | |

FOREIGN PATENT DOCUMENTS

| | | | |
|---|---|---|---|
| DE | 19544490 | 6/1997 | |
| DE | 102009047082 | 5/2011 | |
| WO | 2019207201 | 10/2019 | |
| WO | WO-2019207201 A1 * | 10/2019 | B07C 5/00 |
| WO | 2019215384 | 11/2019 | |

* cited by examiner

A-A

B-B

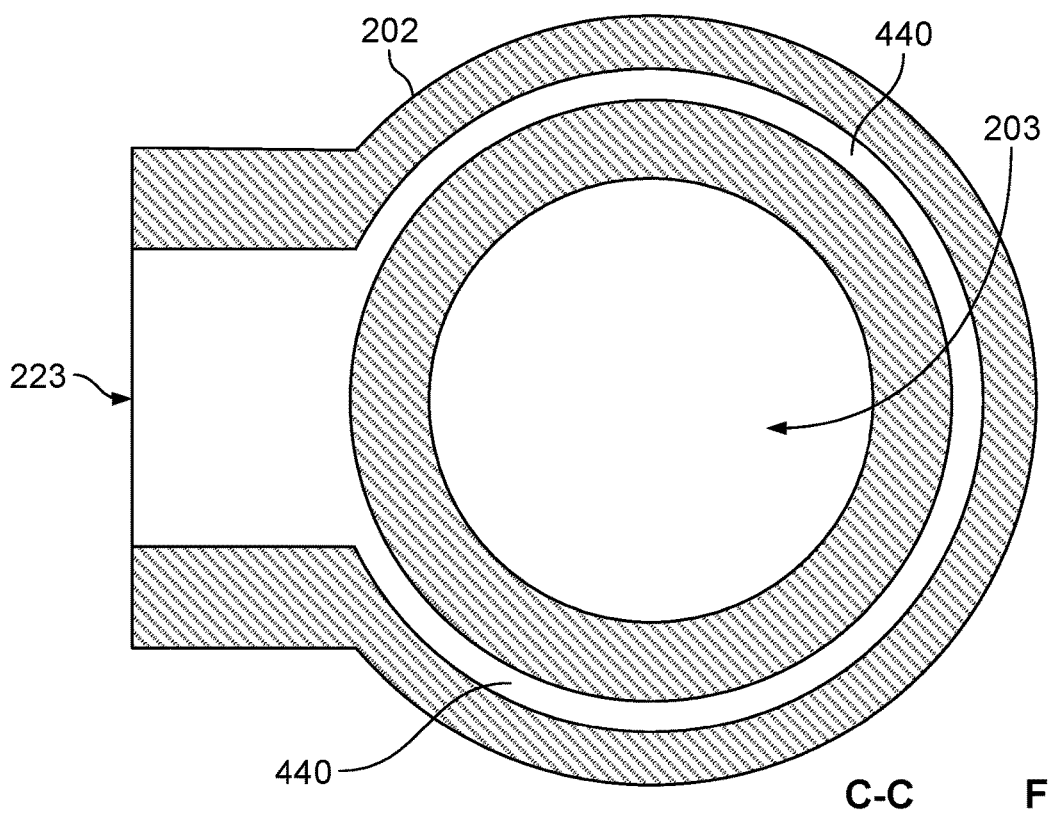
C-C  FIG. 4C
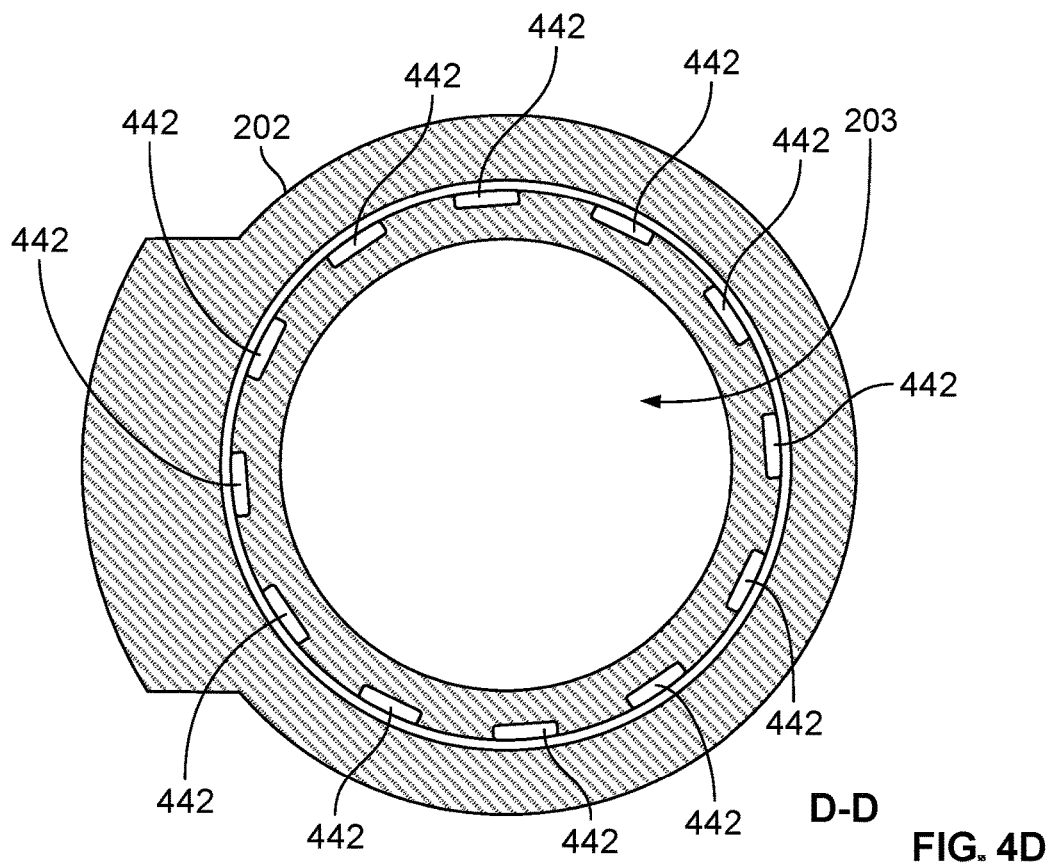
D-D  FIG. 4D

BIDIRECTIONAL AIR CONVEYOR DEVICE FOR MATERIAL SORTING AND OTHER APPLICATIONS

CROSS REFERENCE TO OTHER APPLICATIONS

This application is a continuation of U.S. patent application Ser. No. 17/122,917, entitled BIDIRECTIONAL AIR CONVEYOR DEVICE FOR MATERIAL SORTING AND OTHER APPLICATIONS filed Dec. 15, 2020 which is incorporated herein by reference for all purposes, which claims priority to U.S. Provisional Patent Application No. 62/948,401 entitled SYSTEMS AND METHODS FOR A BIDIRECTIONAL AIR CONVEYOR FOR MATERIAL SORTING AND OTHER APPLICATIONS filed Dec. 16, 2019 which is incorporated herein by reference for all purposes.

BACKGROUND OF THE INVENTION

Within many industrial facilities, objects are transported on conveyor belts from one location to another. Often a conveyor belt will carry an unsorted mixture of various objects and materials. Within recycling and waste management facilities for example, some of the conveyed objects may be considered desirable (e.g., valuable) materials while others may be considered undesirable contaminants. For example, the random and unsorted contents of a collection truck may be unloaded at the facility onto a conveyor belt. Although sorting personnel may be stationed to manually sort materials as it is transported on the belt, the use of sorting personnel is limiting because they can vary in their speed, accuracy, and efficiency and can suffer from fatigue over the period of a shift. Human sorters also require specific working conditions, compensation, and belt speeds. Production time is lost to training the many new employees that enter as sorters, and operation costs increase as injuries and accidents occur.

For the reasons stated above and for other reasons stated below which will become apparent to those skilled in the art upon reading and understanding the specification, there is a need in the art for vacuum extraction for material sorting applications.

BRIEF DESCRIPTION OF THE DRAWINGS

Various embodiments of the invention are disclosed in the following detailed description and the accompanying drawings.

Embodiments of the present disclosure can be more easily understood and further advantages and uses thereof more readily apparent, when considered in view of the description of the preferred embodiments and the following figures in which:

FIGS. 4, 4A, 4B, 4C and 4D are cross-sectional diagrams illustrating a bidirectional air conveyor device in accordance with some embodiments.

In accordance with common practice, the various described features are not drawn to scale but are drawn to emphasize features relevant to the present disclosure. Reference characters denote like elements throughout figures and text.

DETAILED DESCRIPTION

Figure 1:
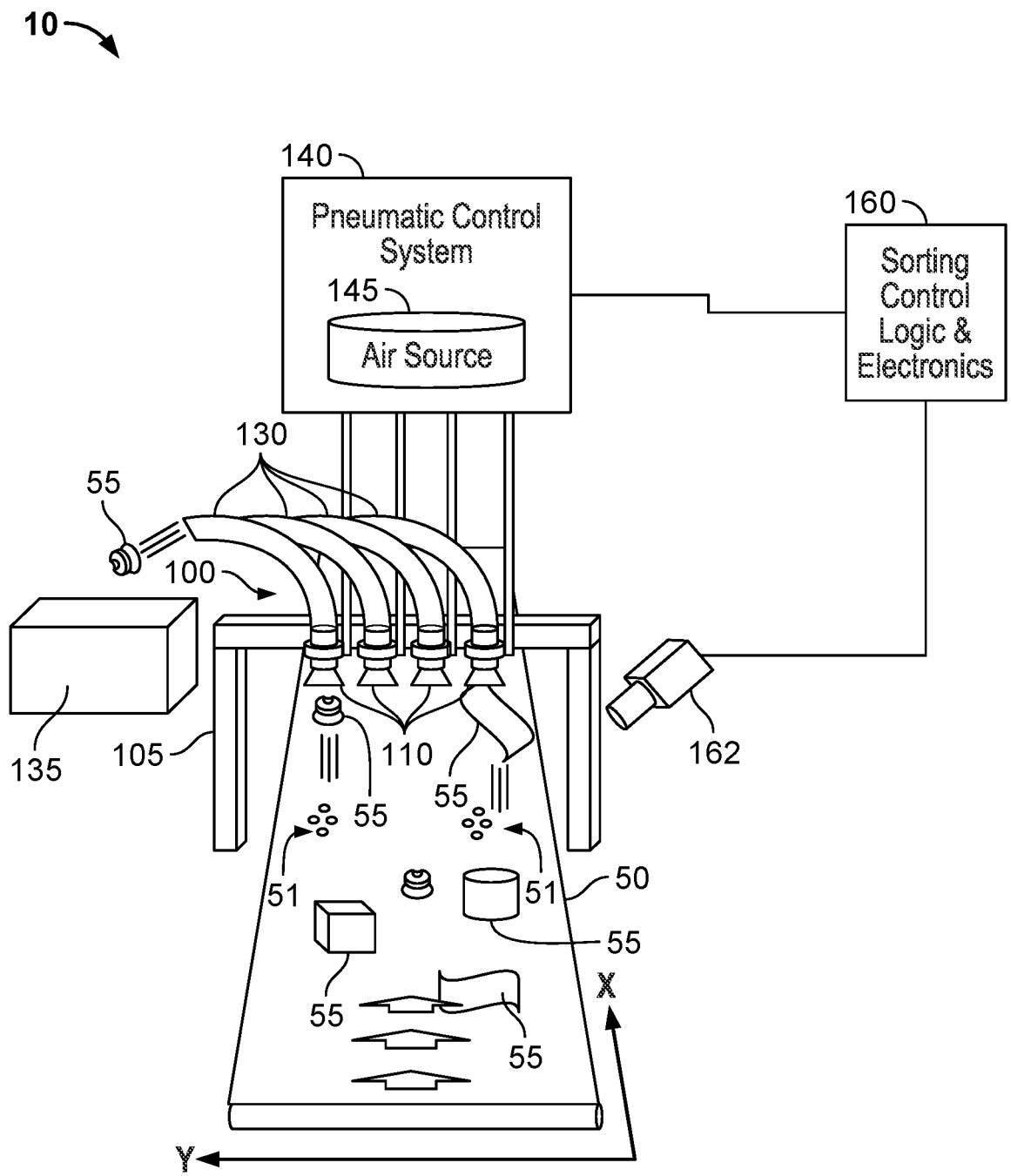
FIG. 1 is a diagram illustrating material sorting system 10 in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

The introduction of sorting systems (such as robotic systems, for example) for sorting materials has led to increased productivity and decreased contamination for Material Recovery Facilities (MRFs). Robots and similar systems have been utilized as a viable replacement, or supplement, for human sorters due to their speed, reliability, and durability. The objective of sorting systems is to recover the specific target material(s) and eject them into bunkers without introducing other materials (contaminants) into the sorted bunkers. A common technique used by these sorting systems to grasp target materials involves the use of a suction gripper. A suction cup gripper connected to a pneumatic system would generate a substantial suction force to grasp targeted objects. Application of the suction force may be curtailed once the object is picked up from the conveyor belt to direct the item into the proper collection bunker. Alternatively or in addition, the air force for a suction gripper may instead operate as an air conveyor that utilizes a vacuum force to pull the target object completely through the gripper housing into a ductwork or similar system that directs the target object to the proper collection bunker.

One issue that affects air conveyors is that when an object is captured (whether it is a target object that is intended to be captured and/or a non-target object that is inadvertently captured), it can become lodged at the input port or within the housing of the air conveyor. For example, a plastic bag identified as a target object can easily pass through the air conveyor, but is located on the conveyor belt adjacent to a non-target rigid cardboard material such that when an airflow is applied to the plastic bag by the air conveyor, both the bag and the cardboard are lifted from the conveyor belt causing a clog because the air conveyor is unable to pass the cardboard. The issue is compounded if the non-target material becomes lodged in the air conveyor, effectively placing the air conveyor out of service and requiring a maintenance technician to manually remove the clog.

Embodiments of a bidirectional air conveyor for material sorting and other applications are described herein. An input signal is received from an object recognition device. In some embodiments, the object recognition device comprises one or more sensors. For example, a sensor comprises an image capturing device (such as, for example, an infrared camera, visual spectrum camera, non-visible electromagnetic radiation sensor, volumetric sensor, or some combination thereof). In some embodiments, the input signal comprises sensed data (e.g., one or more images) of the objects that are being transported by a conveyor device. The input signal is used to determine attribute information associated with a target object (e.g., on the conveyor mechanism). Based on attribute information associated with the target object, an airflow control signal is sent to a pneumatic control system. The airflow control signal is configured to cause the pneumatic control system to supply pressurized air to a bidirectional air conveyor device. The bidirectional air conveyor device is configured to generate a negative pressure airflow using the pressurized air to vacuum the target object towards the bidirectional air conveyor device. In some embodiments, the target object is vacuumed through the hollow housing of the bidirectional air conveyor device (e.g., if the target object is small enough to pass through the housing of the bidirectional air conveyor device). In some embodiments, the target object is adhered to the intake port of the bidirectional air conveyor device by the vacuum force (e.g., if the target object is too large to enter the housing of the bidirectional air conveyor device).

As discussed below, a sorting system that includes a bidirectional air conveyor device as described herein can quickly and accurately remove materials from a moving conveyor mechanism in an efficient and effective manner. In some embodiments, an external control system and object recognition system may be utilized in combination with one or more bidirectional air conveyor devices to identify target objects, control material capture operations, and to activate ejection operations to prevent a material obstruction.

FIG. 1 is a diagram illustrating material sorting system 10 in accordance with some embodiments. In system 10, material extraction assembly 100 is designed to retrieve objects along the width of moving conveyor mechanism 50, such as a conveyor belt, as depicted in FIG. 1. Material identified for removal from conveyor mechanism 50 by material extraction assembly 100 is referred to herein as "target objects." For example, an object may be identified for removal if it is identified to be a target material type. Although waste products travelling on a conveyor belt (e.g., conveyor mechanism 50) are used as example target objects in the example embodiments described herein, it should be understood that in alternate implementations of these embodiments, the target objects need not be waste materials but may comprise any type of material for which it may be desired to sort and/or segregate. Moreover, although a conveyor belt is used as an example conveyance mechanism for transporting the target objects, it should be understood that in alternate implementations of these embodiments, other conveyance mechanisms may be employed. For example, for any of the embodiments described below, in place of an active conveyance mechanism such as conveyor belt, an alternate conveyance mechanism may comprise a chute, slide, or other passive conveyance mechanism through and/or from which material tumbles, falls, or otherwise is gravity fed as it passes by the imaging device. In some embodiments, conveyor mechanism 50 may include features (shown at 51) that increase airflow available as intake into material extraction assembly 100. For example, holes, cleats, treads, or other raised or recessed surface features in, or on, conveyor mechanism 50 may be included in various alternative implementations.

In the example shown in FIG. 1, material extraction assembly 100 comprises a plurality of individual bidirectional air conveyor devices 110. In various embodiments, bidirectional air conveyor devices 110 may be mounted to a static mounting structure (such as a mounting frame) and/or to a dynamically movable structure such as an actuator, robot, or other form of positioning mechanism.

In some implementations, vacuum sorting system 10 further comprises at least one object recognition device 162, which is utilized to capture information about objects on conveyor mechanism 50 in order to discern or distinguish target objects (shown at 55) from non-target objects. In some embodiments, conveyor mechanism 50 transports materials past object recognition device 162 and towards bidirectional air conveyor devices 110. In the example of FIG. 1, conveyor mechanism 50 transports objects along the X-axis towards bidirectional air conveyor devices 110. Object recognition device 162 may comprise an image capturing device (such as, for example, an infrared camera, visual spectrum camera, non-visible electromagnetic radiation sensor, or some combination thereof) directed at conveyor mechanism 50. However, it should be understood that the image capturing device for object recognition device 162 is presented as an example implementation. In other embodiments, object recognition device 162 may comprise any other type of sensor that can detect and/or measure characteristics of objects on conveyor mechanism 50. For example, object recognition device 162 may utilize any form of a sensor technology for detecting non-visible electromagnetic radiation (such as a hyperspectral camera, infrared, or ultraviolet), such as a magnetic sensor; a capacitive sensor; or other sensors commonly used in the field of industrial automation. As such, the signal that is delivered to sorting control logic and electronics 160 from object recognition device 162 may comprise, but is not necessarily, a visual image signal. In the example shown in FIG. 1, object recognition device 162 produces a signal that is delivered to sorting control logic and electronics 160 and which may be used by sorting control logic and electronics 160 to send airflow control signals to pneumatic control system 140. In response to an airflow control signal, pneumatic control system 140 is configured to deliver pressurized air to at least a subset of bidirectional air conveyor devices 110 to enable the at least subset of bidirectional air conveyor devices to initiate material capture and ejection actions.

Figure 1A:
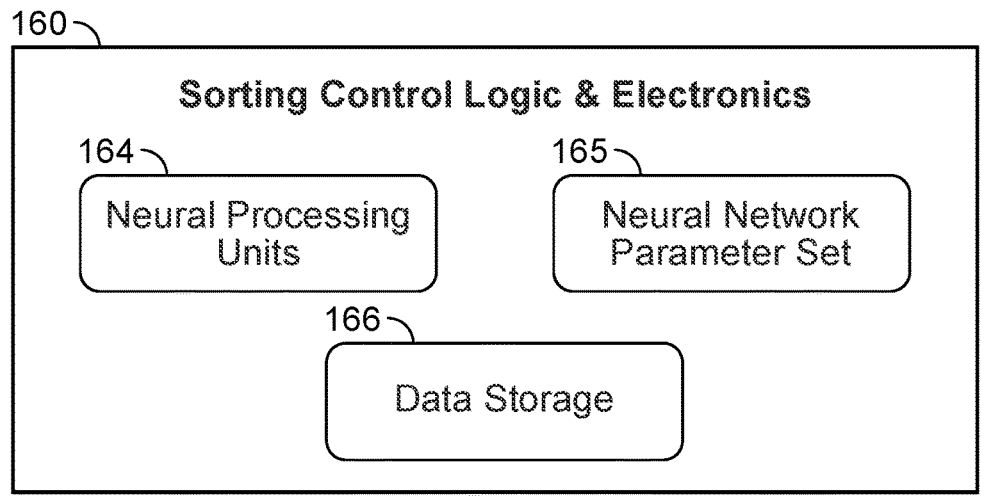
FIG. 1A is a diagram illustrating an example sorting control logic and electronics in accordance with some embodiments.

As shown in FIG. 1A, in some embodiments, sorting control logic and electronics 160 comprises one or more neural processing units 164, neural network parameter set 165 (which stores learned parameters utilized by neural processing units 164), and data storage 166 that stores, for example, object data received from the object recognition device 162, processed object data comprising labeled data, and/or may further be used to store other data such as material characterization data generated by neural processing units 164. Neural network parameter set 165 and data storage 166 may either be implemented together on a common physical non-transient memory device, or on separate physical non-transient memory devices. In some embodiments, data storage 166 may comprise a removable storage media. In various embodiments, sorting control logic and electronics 160 may be implemented using a microprocessor coupled to a memory that is programmed to execute code to carry out the functions of sorting control logic and electronics 160 described herein. In other embodiments, sorting control logic and electronics 160 may additionally, or alternately, be implemented using an application specific integrated circuit (ASIC) or field programmable gate array (FPGA) that has been adapted for machine learning or cloud-based computing. In operation, in some embodiments, object recognition device 162 is directed towards conveyor mechanism 50 in order to capture object information from an overhead view of the materials being transported by conveyor mechanism 50. Object recognition device 162 produces a signal that is delivered to sorting control logic and electronics 160.

In some embodiments, within sorting control logic and electronics 160, raw object data (which in the case of camera sensor may comprise image frames, for example) is provided as input to one or more neural network and artificial intelligence computer programs of neural processing units 164 to locate and identify material appearing within the image frames that are potentially target object 55. As the term is used herein, an "image frame" is intended to refer to a collection or collected set of object data captured by object recognition device 162 that may be used to capture the spatial context of one or more potential target objects on conveyor mechanism 50 along with characteristics about the object itself. A feed of image frames captured by object recognition device 162 is fed, for example, to a machine learning inference computer program implemented by neural processing units 164. The sequence of captured image frames may be processed by multiple processing layers, or neurons, of neural processing units 164 to evaluate the correlation of specific features with features of objects that it has previously learned. Alternative computer programs to detect objects within an image include Fully Convolutional Neural Network, Multibox, Region-based Fully Convolutional Networks (R-FCN), Faster R-CNN, and other techniques commonly known to those skilled in the art as object detection, instance-aware segmentation, or semantic segmentation computer programs described in available literature.

Based on the input raw object data (e.g., image frames) that is provided by object recognition device 162, sorting control logic and electronics 160 is configured to determine information related to target objects that are being transported by conveyor mechanism 50. In some embodiments, the information related to target objects that are determined by sorting control logic and electronics 160 includes attribute information. For example, attribute information includes one or more of, but not limited to, the following: a material type associated with each target object, an approximate mass associated with each target object, an approximate weight associated with each target object, an associated geometry associated with each target object, dimensions (e.g., height and width/area) associated with each target object, a designated deposit location associated with each target object, and an orientation associated with each target object. In some embodiments, the information related to target objects that are determined by sorting control logic and electronics 160 includes location information. For example, location information includes one or more coordinates (e.g., along the X and Y axes as shown in FIG. 1) at which each target object was located in the image frame(s) that were input into sorting control logic and electronics 160. In a specific example, the location information of each target object is the coordinate of the centroid of the target object.

Using the attribute information and/or location information associated with each target object, sorting control logic and electronics 160 is configured to select at least a subset of bidirectional air conveyor devices 110 to use to perform a capture action on a target object. In various embodiments, performing a "capture action" on a target object comprises the use of one or more bidirectional air conveyor devices to emit a vacuum force/airflow that will pull a target object towards the bidirectional air conveyor device(s) and off of the conveyor mechanism. In some embodiments, sorting control logic and electronics 160 is configured to select one or more of bidirectional air conveyor devices 110 to perform a capture action on a target object based on the attribute information associated with the target object and/or the location information associated with the target object. In a first example, a bidirectional air conveyor device is selected to perform a capture action on a target object because the diameter of the housing of the bidirectional air conveyor device is large enough to accommodate the dimensions (e.g., size, width, length, area) of the target object. In a second example, a bidirectional air conveyor device is selected to perform a capture action on a target object because the duct or tubes connected to the outlet port of the bidirectional air conveyor device leads to the correct deposit location to which (e.g., the material type) of the target object is to be deposited. In a third example, more than one contiguous bidirectional air conveyor device is selected to perform a capture action on a target object because the large dimensions (e.g., size, width, length, area) of the target object cannot be accommodated by the vacuum force of a single bidirectional air conveyor device. In a fourth example, a bidirectional air conveyor device is selected to perform a capture action on a target object because the (e.g., static) position of the bidirectional air conveyor device is close to (e.g., within a predetermined distance of) the position of the target object as the target object approaches bidirectional air conveyor devices 110. In a specific example, the Y-coordinate of the centroid of Target Object A is determined by sorting control logic and electronics 160 to be at Y1 of the Y-axis as shown in FIG. 1 as Target Object A is transported along the X-axis as shown in FIG. 1. The bidirectional air conveyor device that is selected to perform a capture action on Target Object A may be the statically positioned bidirectional air conveyor device of bidirectional air conveyor devices 110 that is located at a Y-coordinate along the Y-axis that is closest to Y1, which is the Y-coordinate of Target Object A.

After sorting control logic and electronics 160 selects which one or more bidirectional air conveyor devices of bidirectional air conveyor devices 110 to perform a capture action on a corresponding target object, sorting control logic and electronics 160 is configured to cause the selected bidirectional air conveyor device(s) to perform the capture action on the corresponding target object in response to a determination that the corresponding target object has met a set of capture criteria. In some embodiments, the set of capture criteria is that the current location of the target object is within a predetermined distance with the (e.g., static) location(s) of the selected bidirectional air conveyor device (s). For example, if the current (X, Y) coordinate of the centroid of the target object is within a predetermined distance to the (X, Y) coordinate of the centroid of the selected bidirectional air conveyor device(s), then sorting control logic and electronics 160 is configured to send an airflow control signal to pneumatic control system 140. In some embodiments, the set of capture criteria is that the current location of the target object is aligned with the (e.g., static) location of the selected bidirectional air conveyor devices. The airflow control signal is configured to instruct pneumatic control system 140 to supply an airflow to a respective air input port of each selected bidirectional air conveyor device, as will be described in further detail below, where a corresponding airflow generator within each selected bidirectional air conveyor device is configured to direct the airflow into a vacuum airflow/force that flows from the intake port to the outlet port of each respective selected bidirectional air conveyor device. The vacuum airflow that flows through each of the selected bidirectional air conveyor device(s) will therefore enable a capture action to be performed by the selected bidirectional air conveyor device by drawing the target object off of conveyor mechanism 50 and towards the selected bidirectional air conveyor devices. In some embodiments, the airflow control signal sent by sorting control logic and electronics 160 is a variable control signal that includes a parameter that dictates the pressure of the airflow to be supplied by pneumatic control system 140. The variable control signal will determine the pressure of the airflow and therefore, the amount of vacuum force that will be applied to the target object. In some embodiments, sorting control logic and electronics 160 is configured to instruct a static/fixed pressure for pneumatic airflow (and therefore, static vacuum force) for each capture action. In some embodiments, sorting control logic and electronics 160 is configured to dynamically determine a pressure of pneumatic airflow for each capture action. For example, the pressure of the pneumatic airflow can be dynamically determined based at least in part on the weight or mass of the target object, the size of the target object, the material type of the target object, and the speed of conveyor mechanism 50. If a capture action is successful, a target object is picked up off conveyor mechanism 50 by corresponding selected bidirectional air conveyor device(s).

Once a target object (e.g., such as target object 55) is removed from conveyor mechanism 50, it passes through bidirectional air conveyor devices 110. In some embodiments, the target object may be transported by a hood, hoses, ducts, or tubes 130 leading to a holding bin, tank, bunker, receptacle or other designated deposit location 135 where extracted target objects 55 are deposited. The particular destination for items removed from conveyor mechanism 50 may depend upon whether they are contaminants or desired materials. In some embodiments, receptacle 135 may be adjacent to vacuum sorting system 10 while in others, it may be remotely located away from vacuum sorting system 10. In some embodiments, receptacle 135 may comprise a cargo area of a truck or other vehicle so that removed target objects 55 are directly loaded onto the vehicle for transport. In some embodiments, the hood, hoses, ducts, or tubes 130 may include controllable valves or other controllable diverters that control the material flow of removed target objects 55 that have entered suction ducting 130 so that various object disposal locations (that is, multiple alternate receptacles 135) may be selected for any of the plurality of bidirectional air conveyor devices 110. That is, ducting 130 may be configurable and reconfigurable using the controllable valves or other controllable diverters (by sorting control logic and electronics 160 or other controller) such that target objects 55 extracted by one of bidirectional air conveyor devices 110 of assembly 100 may be routed to a different receptacle 135 than target objects 55 extracted by another one of bidirectional air conveyor devices 110 of assembly 100. Moreover, if receptacle 135 is reaching full capacity, ducting 130 may be re-configured to route extracted target objects 55 to a different receptacle.

Figure 1B:
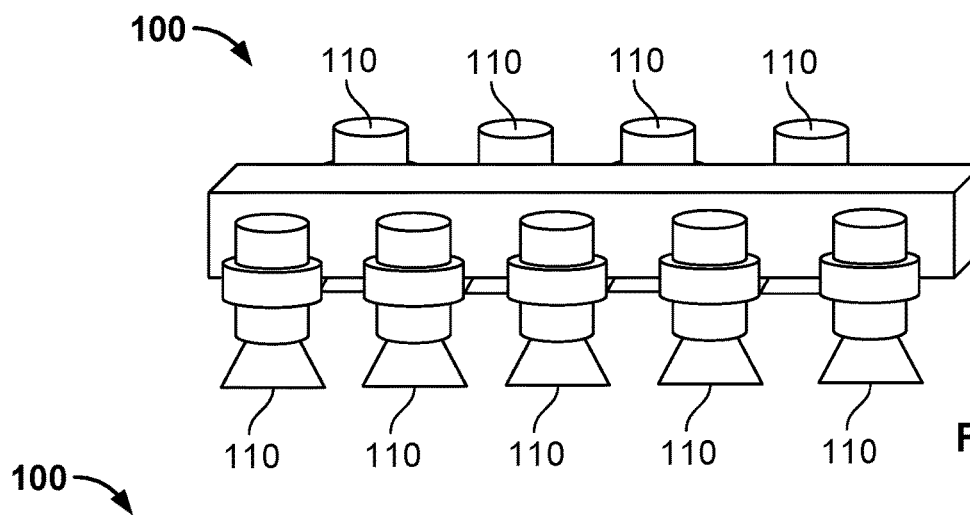
FIGS. 1B and 1C are diagrams illustrating alternate bidirectional air conveyor device arrangements for example vacuum extraction assemblies in accordance with some embodiments.
Figure 1C:
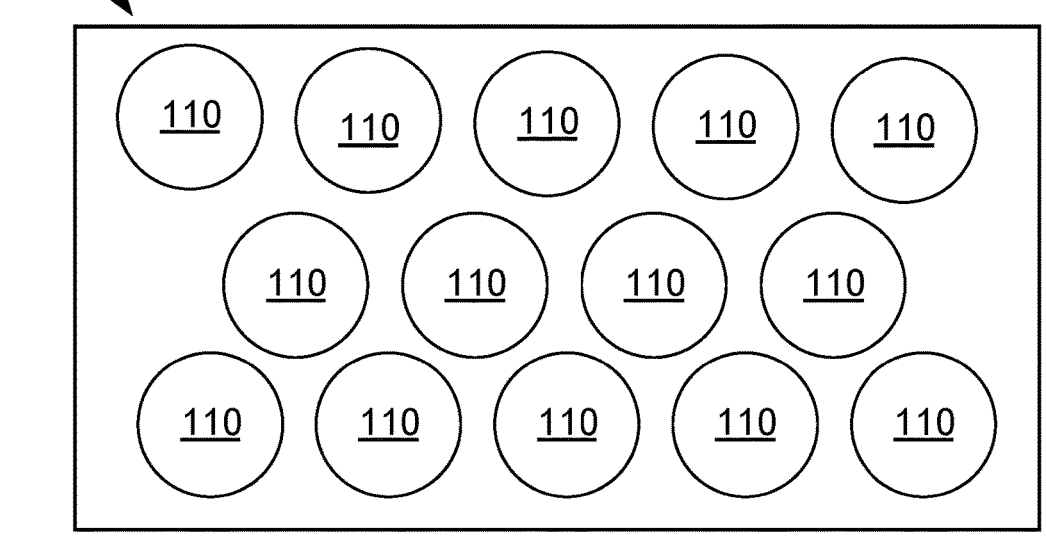

It should be understood that in alternate implementations, bidirectional air conveyor devices 110 may be positioned around conveyor mechanism 50 in various arrangements or geometries. That is, in some embodiments, material extraction assembly 100 may comprise a single row of bidirectional air conveyor devices 110 arranged in a line across conveyor mechanism 50 perpendicular with respect to the direction of material travel, such as shown in FIG. 1. In other embodiments, such as shown in FIG. 1B and FIG. 1C, material extraction assembly 100 may comprise a plurality of rows of bidirectional air conveyor devices 110, where bidirectional air conveyor devices 110 of one row are offset from bidirectional air conveyor devices 110 of another row so that material that passes between bidirectional air conveyor devices 110 may be better aligned to the bidirectional air conveyor devices 110 of the next row for capture. As such sorting control logic and electronics 160 may actuate bidirectional air conveyor device(s) 110 best aligned for capturing a target object 55 (for example, based on the position of target object 55 on conveyor mechanism 50). However, it should also be understood that in some embodiments, material extraction assembly 100 may comprise only a single bidirectional air conveyor device 110. Furthermore, the height of bidirectional air conveyor device(s) 110 above conveyor mechanism 50 may be statically or dynamically adjustable when bidirectional air conveyor devices 110 are arranged over conveyor mechanism 50. For example, if the objects to be transported by conveyor mechanism 50 are anticipated or detected to be tall (e.g., of greater heights relative to the surface of conveyor mechanism 50), then bidirectional air conveyor devices 110 can be dynamically arranged to be at a greater height above conveyor mechanism 50 to provide more clearance to the objects, to avoid objects hitting bidirectional air conveyor devices 110, and/or to prevent objects from clogging bidirectional air conveyor devices 110. However, if the objects to be transported by conveyor mechanism 50 are anticipated or detected not to be tall (e.g., of shorter heights relative to the surface of conveyor mechanism 50), then bidirectional air conveyor devices 110 can be dynamically arranged to be at a shorter height above conveyor mechanism 50 to provide less clearance to the objects. The height of bidirectional air conveyor devices 110 over conveyor mechanism 50 may be one factor, among many, that is considered if/when the vacuum/suction force that is to be applied by bidirectional air conveyor devices 110 is dynamically determined during a capture action for a particular target object.

Where material extraction assembly 100 does comprise a plurality of bidirectional air conveyor devices 110, they need not be uniform in size. For example, material extraction assembly 100 may comprise one or more bidirectional air conveyor devices 110 of a first size, and one or more bidirectional air conveyor devices 110 of a second size. They also need not be uniform in geometry. For example, sorting control logic and electronics 160 may determine that target object 55 has a certain characteristic (for example, size, shape, orientation, material type or composition or any other characteristic discernible by sorting control logic and electronics 160) and correlate that characteristic with a specific one of bidirectional air conveyor devices 110 of material extraction assembly 100 best suited for capturing objects having that characteristic. One of bidirectional air conveyor devices 110 with wider diameters may be selected to capture flexible materials like bags and sheets and one of bidirectional air conveyor devices 110 with smaller diameters may be selected to capture more rigid objects. For example, an object identified as being a disposable ground-coffee pod may be selected for extraction by one of bidirectional air conveyor devices 110 of a first size, while a sheet of plastic wrap may be selected for extraction by bidirectional air conveyor devices 110 of a second size. In some embodiments, neural processing units 164 output one or more physical object attributes determined by the one or more neural processing units based on the object data for the one or more target objects appearing in captured image frames.

Figure 2:
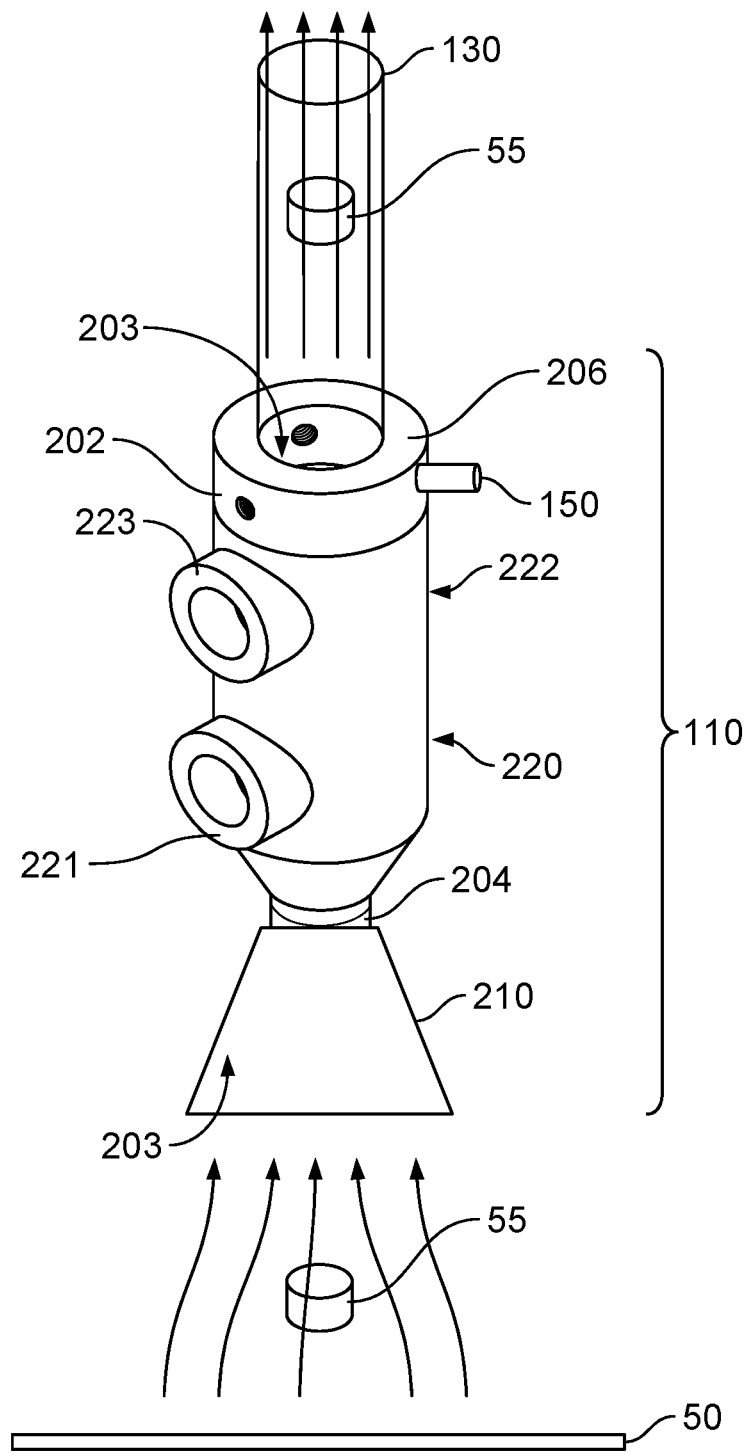
FIG. 2 is a diagram illustrating an example bidirectional air conveyor device in accordance with some embodiments.

FIG. 2 is a diagram illustrating an example bidirectional air conveyor device in accordance with some embodiments. In some embodiments, at least some bidirectional air conveyor devices 110 of FIGS. 1, 1A, 1B, and 1C may be implemented with the example bidirectional air conveyor device that is shown in FIG. 2. In the example of FIG. 2, the bidirectional air conveyor device comprises housing 202 that includes internal through-passageway 203 through which captured target objects 55 may be carried from intake port 204 of housing 202 to outlet port 206 of housing 202. In some embodiments, outlet port 206 may be coupled to ducting 130 to transport captured target object 55 to receptacle 135. In some embodiments, the bidirectional air conveyor device can be augmented with attachments 210 (e.g., such as a converging cone or a funnel), such as but not limited to direct the airflow over a specific area or assist in guiding the material into the vacuum produced by the bidirectional air conveyor device. Other attachments 210 may include, but are not limited to, material shredders or material sorting features.

As shown in FIG. 2, the bidirectional air conveyor device comprises at least a pair of airflow generators (shown at 220 and 222). The first air flow generator, airflow generator 220, which may be referred to herein as "object capture airflow generator" 220, generates a negative pressure airflow (i.e., a suction/vacuum air flow) into intake port 204 of the bidirectional air conveyor device. This airflow intake results in a force of airflow (i.e., a vacuum or negative pressure force) into intake port 204 that may be used to extract target object 55 from conveyor mechanism 50 and lift it into internal through-passageway 203 of the bidirectional air conveyor device. The second airflow generator, airflow generator 222, which may be referred to herein as the "object ejection airflow generator" 222, generates a positive pressure airflow outflow out from intake port 204 of the bidirectional air conveyor device. This airflow outflow results in a positive airflow force that flows through internal through-passageway 203 and out from intake port 204 that may be used to eject obstructions (i.e., non-target objects or lodged target objects) out from intake port 204 of the bidirectional air conveyor device, or for other uses.

In some embodiments, each of first and second airflow generators 220, 222 may incorporate the structure of a Venturi and/or Coanda based technology, or similar technology, to generate their respective airflows. That is, the motive forces that create the airflows through the bidirectional air conveyor device are the result of a flow of compressed air streams supplied by air source 145 (for example, a compressed or pressurized air source) of pneumatic control system 140. As further discussed in detail below, coupling pressurized air input port 221 of first airflow generator 220 to air source 145 will activate first airflow generator 220 to generate the negative pressure (e.g., suction/vacuum) airflow into intake port 204. Coupling pressurized air input port 223 of the second airflow generator 222 to pressurized air source 145 will activate the second airflow generator 222 to generate the positive pressure (e.g., ejection) airflow out of intake port 204.

Figure 3:
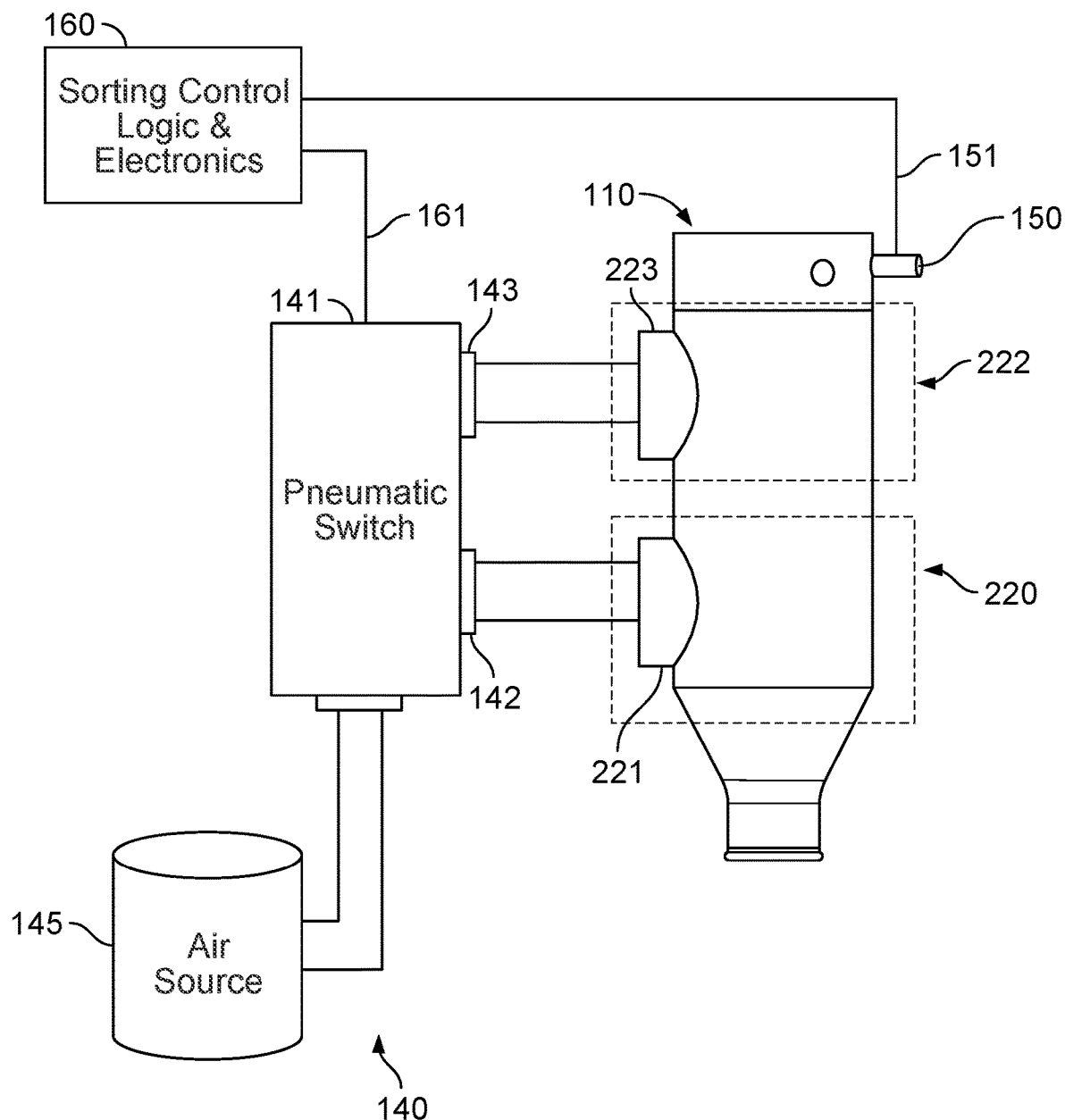
FIG. 3 illustrates an interconnection of an example pneumatic control system in accordance with some embodiments.

FIG. 3 illustrates an interconnection of an example pneumatic control system in accordance with some embodiments. In some embodiments, pneumatic control system 140 that is coupled to first and second airflow generators 220, 222 of one of bidirectional air conveyor devices 110 can have interconnections such as shown in the example of FIG. 3. The pneumatic control system provides an air supply for selectively operating and controlling both airflow generators 220 and 222 of one bidirectional air conveyor device of bidirectional air conveyor devices 110. In alternate implementations, air source 145 may comprise a blower, an air compressor, a compressed air storage tank, or some combination thereof. Although this disclosure may refer to "air" with regards to "airflow," "air compressor," and other elements, it should be understood that the term "air" is used in a generic sense to refer to any compressible gas or mixture of gasses. It should also be understood that the terms "pressurized air" and "compressed air" are used herein synonymously and generally used to refer to air having a pressure that is greater than atmospheric pressure as would be understood by one of ordinary skilled in the art.

In the example of FIG. 3, the pneumatic control system comprises pneumatic switch 141 coupled to air source 145. Pneumatic switch 141 is also coupled to sorting control logic and electronics 160 from which it receives airflow control signal 161. In response to airflow control signal 161, in some embodiments, pneumatic switch 141 may direct pressurized air to either pressurized air input port 221 of first airflow generator 220, pressurized air input port 223 of second airflow generator 222, or may close the supply of pressurized air to both air input ports 221, 223.

For example, in one example in operation, when object recognition device 162 identifies target object 55 to remove from conveyor mechanism 50, a first airflow control signal is sent by sorting control logic and electronics 160 to pneumatic switch 141 to activate the supply of compressed air to first pressurized air input port 221 to activate object capture airflow generator 220 of the bidirectional air conveyor device. The timing of the airflow control signal sent by sorting control logic and electronics 160 is controlled so that the activation of object capture airflow generator 220 occurs at a point in time where target object 55 has met a set of capture criteria (e.g., is aligned with and/or is within a predetermined distance) of the bidirectional air conveyor device that had been selected to perform a capture action on that particular target object. During the capture action, the negative pressure (e.g., vacuum) force that is generated by object capture airflow generator 220 should be effectively strong enough to capture target object 55 by lifting target object 55 off of conveyor mechanism 50. In some embodiments, while not shown in FIG. 1, a selected bidirectional air conveyor device may be repositioned to better align with target object 55 (e.g., along the X-axis and/or the Y-axis) to facilitate a better capture action in cases where target object 55 might otherwise not align with (e.g., pass directly under) the selected bidirectional air conveyor device.

In the example of FIG. 3, pressurized air input port 221 of object capture airflow generator 220 is coupled to a first pressurized air output port, pressurized air output port 142, of pneumatic switch 141. When pneumatic switch 141 receives the airflow control signal, an output of first pressurized output port 142 is controlled to supply pressurized air to pressurized air input port 221 of object capture airflow generator 220 of the bidirectional air conveyor device. In some embodiments, sorting control logic and electronics 160 may output a binary on/off control signal so that pneumatic switch 141 either turns the pressurized air to pressurized air input port 221 of object capture airflow generator 220 of the bidirectional air conveyor device on or off. In other embodiments, sorting control logic and electronics 160 may output a variable control signal to pneumatic switch 141, where the variable control signal indicates an amount of pneumatic airflow to be supplied to pressurized air input port 221 of object capture airflow generator 220 of the bidirectional air conveyor device. In this way, sorting control logic and electronics 160 can variably control the negative pressure (e.g., vacuum) force applied by the bidirectional air conveyor device to target object 55 during a capture action.

Also in the example shown in FIG. 3, pressurized air input port 223 of object ejection airflow generator 222 may be coupled to second compressed air output port 143 of the pneumatic switch 141. When the control signal from sorting control logic and electronics 160 instead instructs pneumatic switch 141 to activate object ejection airflow generator 222, pneumatic switch 141 controls output of second output port 143 to supply pressurized air to pressurized air input port 223 of object ejection airflow generator 222 of the bidirectional air conveyor device. In some embodiments, sorting control logic and electronics 160 may output binary on/off control signal 161 so that pneumatic switch 141 either turns the pressurized air to pressurized air input port 223 of the object ejection airflow generator 222 of the bidirectional air conveyor device on or off. In other embodiments, sorting control logic and electronics 160 may output a variable control signal to pneumatic switch 141, wherein the variable control signal indicates an amount of pneumatic airflow to be supplied to pressurized air input port 223 of object ejection airflow generator 222 of the bidirectional air conveyor device. In this way, sorting control logic and electronics 160 can variably control the ejection force applied by the bidirectional air conveyor device to eject an obstruction.

In some embodiments, while pneumatic switch 141 provides pressurized air to both air input ports 221 and 223 of the bidirectional air conveyor device, pneumatic switch 141 does not control the direction or type of pressure (e.g., positive or negative) of the airflow that flows through the bidirectional air conveyor device. Rather, a respective set of physical features (which are sometimes referred as an "airflow generator") corresponding to each of air input ports 221 and 223 within the interior of the bidirectional air conveyor device is configured to generate either a negative or positive pressure based on the supplied pressurized air. Specifically, object capture airflow generator 220 corresponding to air input port 221 is configured to generate a negative pressure airflow (e.g., to allow the bidirectional air conveyor device to perform a capture action) when pneumatic switch 141 is controlled to supply pressurized air into air input port 221. Furthermore, object ejection airflow generator 222 corresponding to air input port 223 is configured to generate a positive pressure airflow (e.g., to eject content out of the bidirectional air conveyor device) when pneumatic switch 141 is controlled to supply pressurized air into air input port 223, as will be described in further detail below.

While FIG. 3 shows a single pneumatic switch, pneumatic switch 141, that is configured to supply pressurized air to both air input ports 221 and 223 of the bidirectional air conveyor device, in some embodiments, a separate pneumatic switch can supply pressurized air to each of air input ports 221 and 223 of the bidirectional air conveyor device.

In some embodiments, each bidirectional air conveyor device of bidirectional air conveyor devices 110 may comprise material obstruction sensor 150 (for example, at outlet port 206) that sends feedback signal 151 to sorting control logic and electronics 160 to indicate when a collected item fully passes through the bidirectional air conveyor device, or alternately, to indicate when a collected item has not fully passed through the bidirectional air conveyor device (for example, when a target or non-target object has become an obstruction). Material obstruction sensor 150 is not limited to any particular technology, and may comprise, for example, a pressure sensor, airflow sensor, ultrasonic sensor, infrared sensor, image sensor, opacity sensor, or the like. In some embodiments, material obstruction sensor 150 is used to detect whether a capture action on target object 55 has been successful. For example, material obstruction sensor 150 can detect that a capture action on target object 55 has been successful where material obstruction sensor 150 determines that after a negative pressure (e.g., vacuum) force is applied on target object 55, an obstruction (e.g., target object 55 passing through the bidirectional air conveyor device) is detected but that the obstruction also disappears (e.g., target object 55 having left the bidirectional air conveyor device and through ducting 130). In some embodiments, when feedback signal 151 indicates a successful capture action where target object 55 has passed through the bidirectional air conveyor device, sorting control logic and electronics 160 may respond with a control signal to operate pneumatic switch 141 to deactivate supplying pressurized air to object capture airflow generator 220 via air input port 221. Alternatively, if material obstruction sensor 150 detects an obstruction, sorting control logic and electronics 160 may respond with a control signal to operate pneumatic switch 141 to deactivate supplying pressurized air to object capture airflow generator 220 via air input port 221, and instead activate supplying pressurized air to object ejection airflow generator 222 via air input port 223 to eject the obstruction from the bidirectional air conveyor device using a positive pressure ejection airflow.

Although FIG. 3 illustrates pneumatic switch 141 as a three-state switch, it should be understood that the functions and operations attributed to pneumatic switch 141 in this disclosure may be implemented in any number of ways. For example, pneumatic switch 141 may be implemented using a combination of manifolds, controllable valves, and/or sets of pneumatic switches or other technology for selectively controlling the distribution of compressed air. It should also be understood that activation and deactivation of either object capture airflow generator 220 or object ejection airflow generator 222 may also, in some embodiments, be controlled manually by an operator (either locally or remotely) in addition to being controlled by sorting control logic and electronics 160. In some embodiments, sorting control logic and electronics 160 may instead, or in addition, periodically activate object ejection airflow generator 222 even in the absence of a detected obstruction at the elapse of every ejection period (for example, every 5 minutes) to purge the system of clogs or accumulating particulates. In still other embodiments, multiple bidirectional air conveyor devices 110 may be coupled to, and operated by pneumatic switch 141 at the same time in the manner described above. For example, manifolds, including solenoid actuated manifolds, may be used to distribute pressurized air from pneumatic switch 141 to multiple bidirectional air conveyor devices 110.

Figure 4:
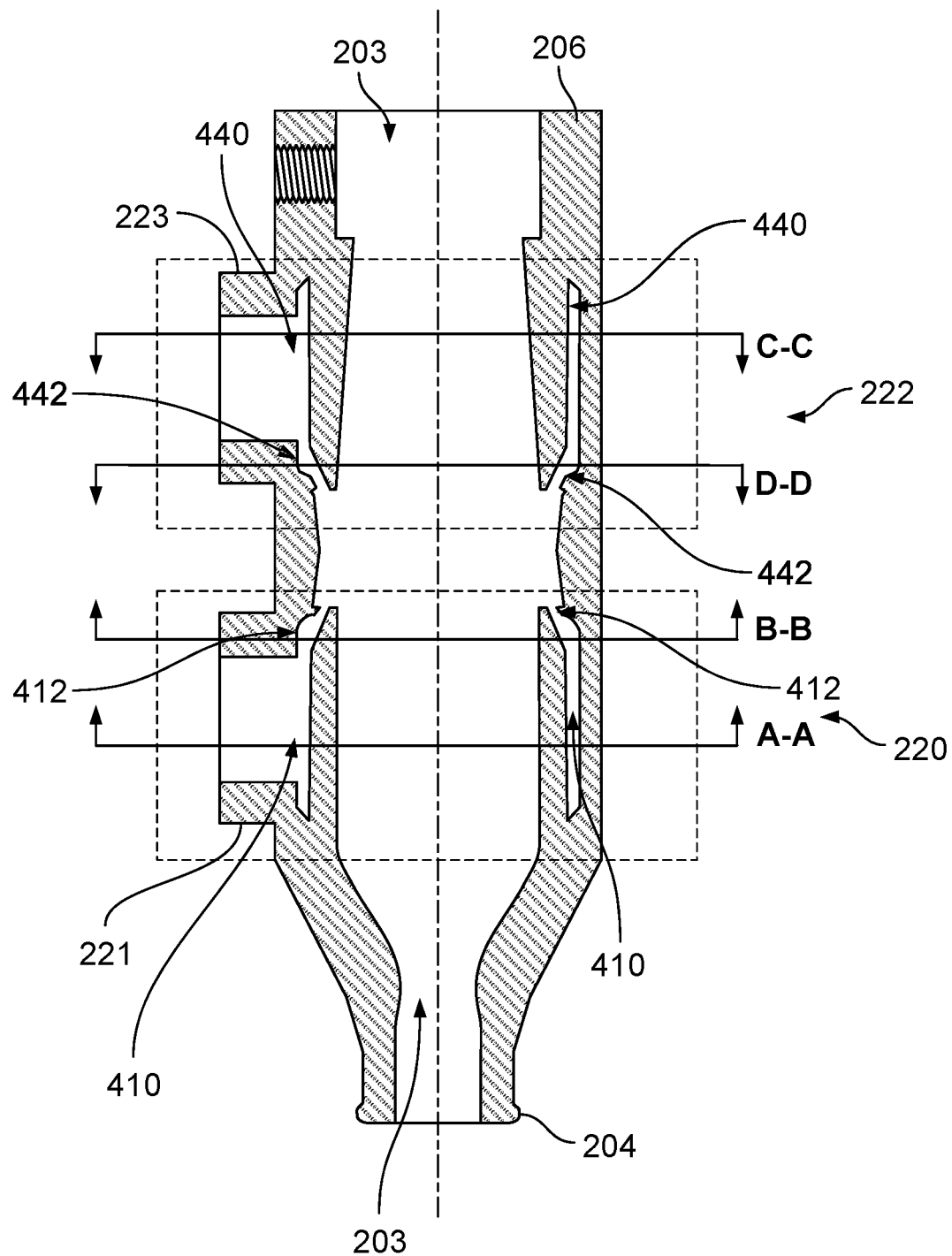
Figure 4A:
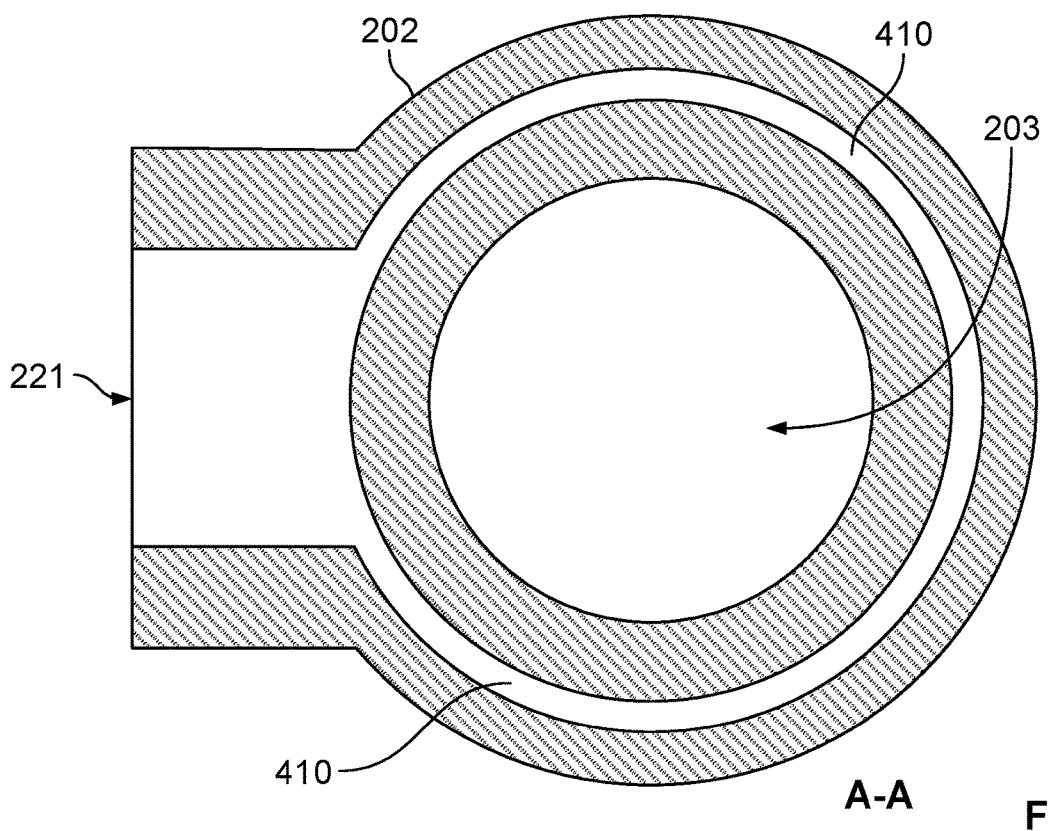
Figure 4B:
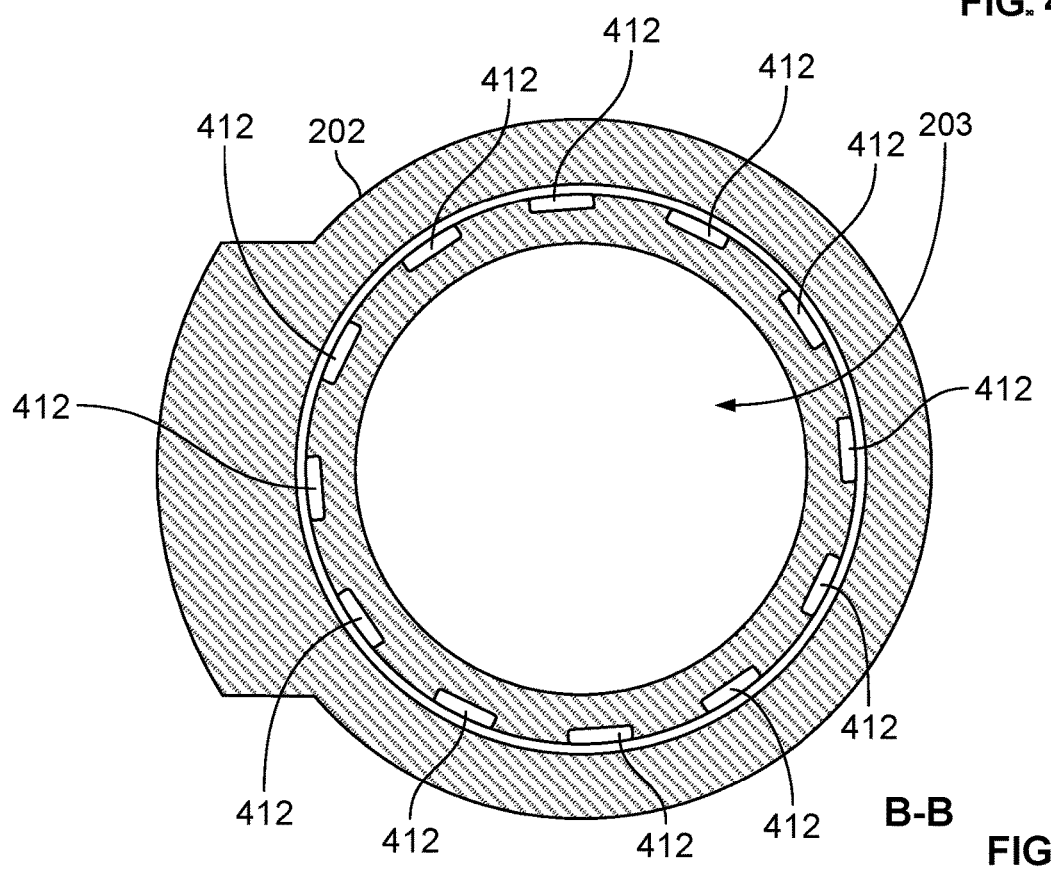

FIGS. 4, 4A, 4B, 4C, and 4D are figures depicting cut-away views of an example bidirectional air conveyor device. In some embodiments, at least some of bidirectional air conveyor devices of bidirectional air conveyor devices 110 can be implemented using the examples of FIGS. 4, 4A, 4B, 4C, and 4D. FIG. 4 provides a cut-away side view illustrating the internal structure of object capture airflow generator 220 and object ejection airflow generator 222. FIGS. 4A and 4B provide cross-sectional top views of object capture airflow generator 220 for cross-sections A-A and B-B. FIGS. 4C and 4D provide cross-sectional top views of object ejection airflow generator 222 for cross-sections C-C and D-D.

With respect to object capture airflow generator 220, pressurized air input port 221 is communicatively coupled to first high-pressure air distribution ring 410 within housing 202 that at least partially encircles internal through-passageway 203. A plurality of air ejector nozzles (shown at 412) is coupled to the first high-pressure air distribution ring 410 and positioned around the ring. Air ejector nozzles 412 are positioned to direct compressed air entering the first high-pressure air distribution ring 410 (from pressurized air input port 221) into internal through-passageway 203 in a direction away from intake port 204 and towards outlet port 206. In some embodiments, a tapered shape of air ejector nozzles 412 may be utilized to further compress the air ejected into internal through-passageway 203. The air enters internal through-passageway 203 at high speeds and rapidly expands upon entry to create a relative low pressure region within housing 202 of the bidirectional air conveyor device that draws an airflow in from intake port 204 and out from outlet port 206. The orientation of air ejector nozzles 412, which direct the expanding compressed air away from intake port 204 and towards outlet port 206, establishes the directionality of the airflow through the bidirectional air conveyor device to be in from intake port 204 and out from outlet port 206 so that materials (e.g., target objects 55) that are located below intake port 204 (e.g., on a conveyor mechanism) may be captured/suctioned/vacuumed by the bidirectional air conveyor device. The force of the airflow generated by object capture airflow generator 220 may be controlled as a function of the pressure and/or volume of air delivered to pressurized air input port 221 and/or the design (e.g., the taper) of air ejector nozzles 412, at least.

With respect to object ejector airflow generator 222, pressurized air input port 223 is communicatively coupled to second high-pressure air distribution ring 440 within housing 202 that at least partially encircles internal through-passageway 203. A plurality of air ejector nozzles (shown at 442) is coupled to the second high-pressure air distribution ring 440 and positioned around the ring. Air ejector nozzles 442 are positioned to direct pressurized air entering the second high-pressure air distribution ring 440 (from compressed air input port 223) into internal through-passageway 203 in a direction towards intake port 204 and away from outlet port 206. In some embodiments, a tapered shape of air ejector nozzles 442 may be utilized to further compress the air ejected into internal through-passageway 203. The air enters internal through-passageway 203 at high speeds and rapidly expands upon entry to create a relative low pressure region within housing 202 of the bidirectional air conveyor device that draws an airflow in from outlet port 206 and out from intake port 204. The orientation of air ejector nozzles 442 that directs the expanding compressed air away from outlet port 206 and towards intake port 204 at a high velocity establishes the directionality of the airflow through the bidirectional air conveyor device to be in from outlet port 206 and out from intake port 204 so that obstructions may be ejected from the bidirectional air conveyor device through intake port 204. The force of the airflow generated by the object ejector airflow generator 222 may be controlled as a function of the pressure and/or volume of air delivered to the compressed air input port 223 and/or the design (e.g., the taper) of air ejector nozzles 442, at least.

It should be understood that the present disclosure expressly conveys within its scope alternative embodiments that may comprise object capture airflow generator 220, but not necessarily also comprise object ejection airflow generator 222. That is, any of the embodiments described herein may instead be for embodiments that comprise an alternative unidirectional air conveyor device having object capture airflow generator 220, without object ejection airflow generator 222.

Figure 5:
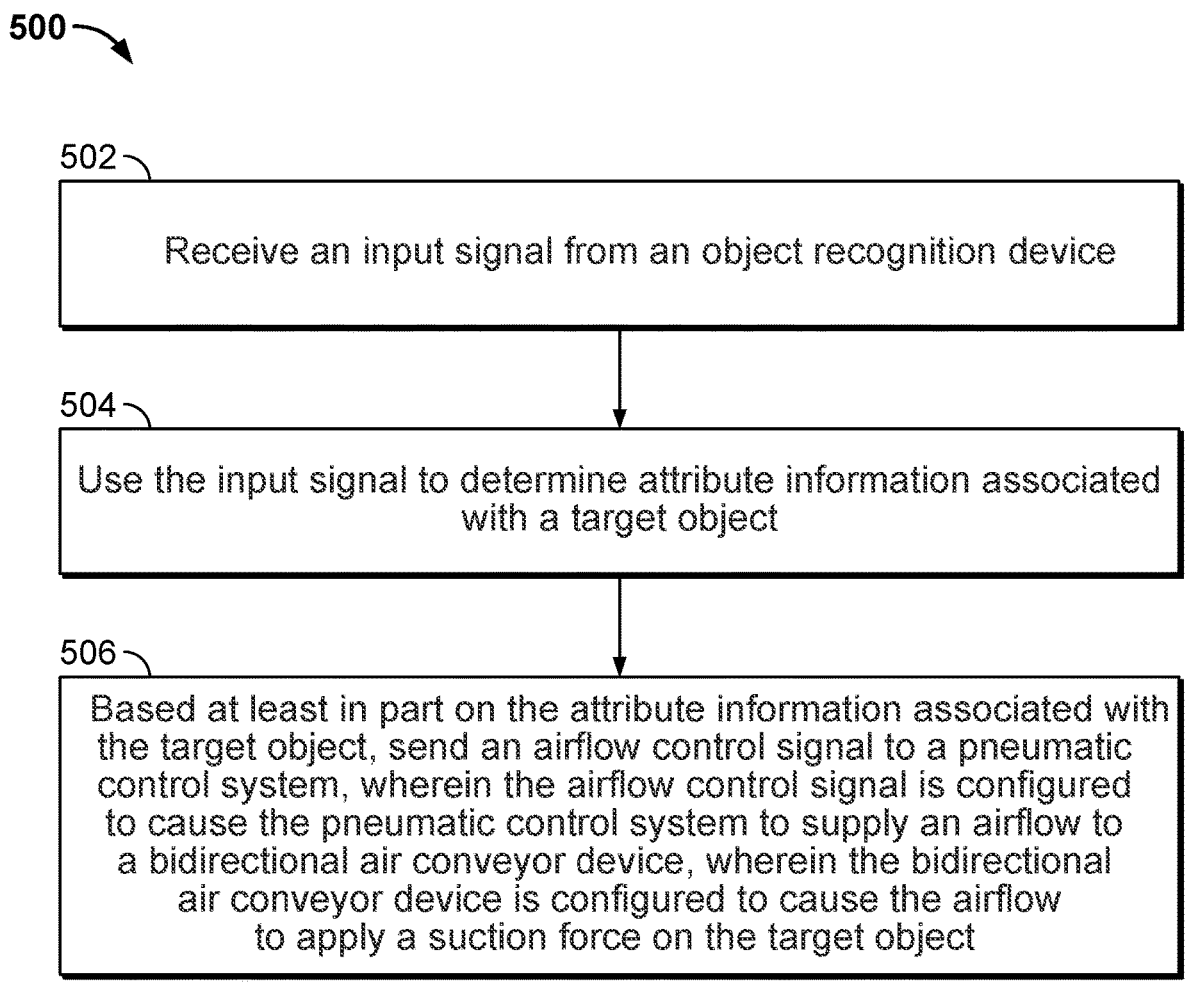
FIG. 5 is a flow diagram showing an embodiment of a process for using a bidirectional air conveyor device to perform a capture action on a target object.

FIG. 5 is a flow diagram showing an embodiment of a process for using a bidirectional air conveyor device to perform a capture action on a target object. In some embodiments, process 500 is implemented by sorting control logic and electronics 160 of FIG. 1.

At 502, an input signal is received from an object recognition device. In some embodiments, the input signal comprises one or more images of objects that are being transported on a conveyor mechanism.

At 504, the input signal is used to determine attribute information associated with a target object. In some embodiments, the input signal is input into a machine learning model that is trained to, at least, identify the material types of objects. For example, objects are designated as being "target objects" if they are identified to be of a target material type and objects are designated as being "non-target objects" if they are identified to be of a material type that is not a target material type. The output by the machine learning model includes attribute information such as one or more of, but not limited to, the following: a material type associated with each target object, an approximate mass associated with each target object, a geometry associated with each target object, dimensions (e.g., height and width/area) associated with each target object, a designated deposit location associated with each target object, and an orientation associated with each target object. In some embodiments, the location information of each target object that is identified in the input signal is also determined using the input signal. For example, location information includes one or more coordinates at which each target object was located on the conveyor mechanism in the input signal.

At 506, based at least in part on the attribute information associated with the target object, an airflow control signal is sent to a pneumatic control system, wherein the airflow control signal is configured to cause the pneumatic control system to supply an airflow to a bidirectional air conveyor device, wherein the bidirectional air conveyor device is configured to cause the airflow to apply a suction force on the target object. In some embodiments, using the attribute information and/or location information of the target object, an airflow control signal is sent to a pneumatic control system that is configured to supply pressurized air to an air input port of a bidirectional air conveyor device of the vacuum sorting system. The supplied pressurized air will be channeled into a negative pressure, vacuum/suction airflow that will flow from the intake port of the bidirectional air conveyor device to the outlet port of the bidirectional air conveyor device. As the target object is transported by the conveyor mechanism below the bidirectional air conveyor device, the generated vacuum/suction force will lift the target object off of the conveyor mechanism and towards the bidirectional air conveyor device. If the target object is small enough, the target object will enter the housing of the bidirectional air conveyor device and pass through the bidirectional air conveyor device and into a ducting that will deposit the target object in a receptacle (e.g., associated with collecting objects of the material type associated with the target object). However, if the target object is too large to pass through the bidirectional air conveyor device, then the target object may become adhered to the intake port (or a corresponding attachment such as a suction cup) until either the vacuum/suction force is deactivated and/or a positive pressure, ejection force is emitted from the bidirectional air conveyor device.

As described above, in the event of a detected obstruction or in response to the elapse of an ejection period, another airflow control signal is sent to the pneumatic control system to cause the pneumatic control system to supply pressurized air to a second air input port of the bidirectional air conveyor device. The pressurized air that is supplied to this second air input port will be channeled into a positive pressure, ejection airflow that will flow from the outlet port of the bidirectional air conveyor device to the intake port of the bidirectional air conveyor device and eject any obstructions or debris out of the bidirectional air conveyor device.

Figure 6:
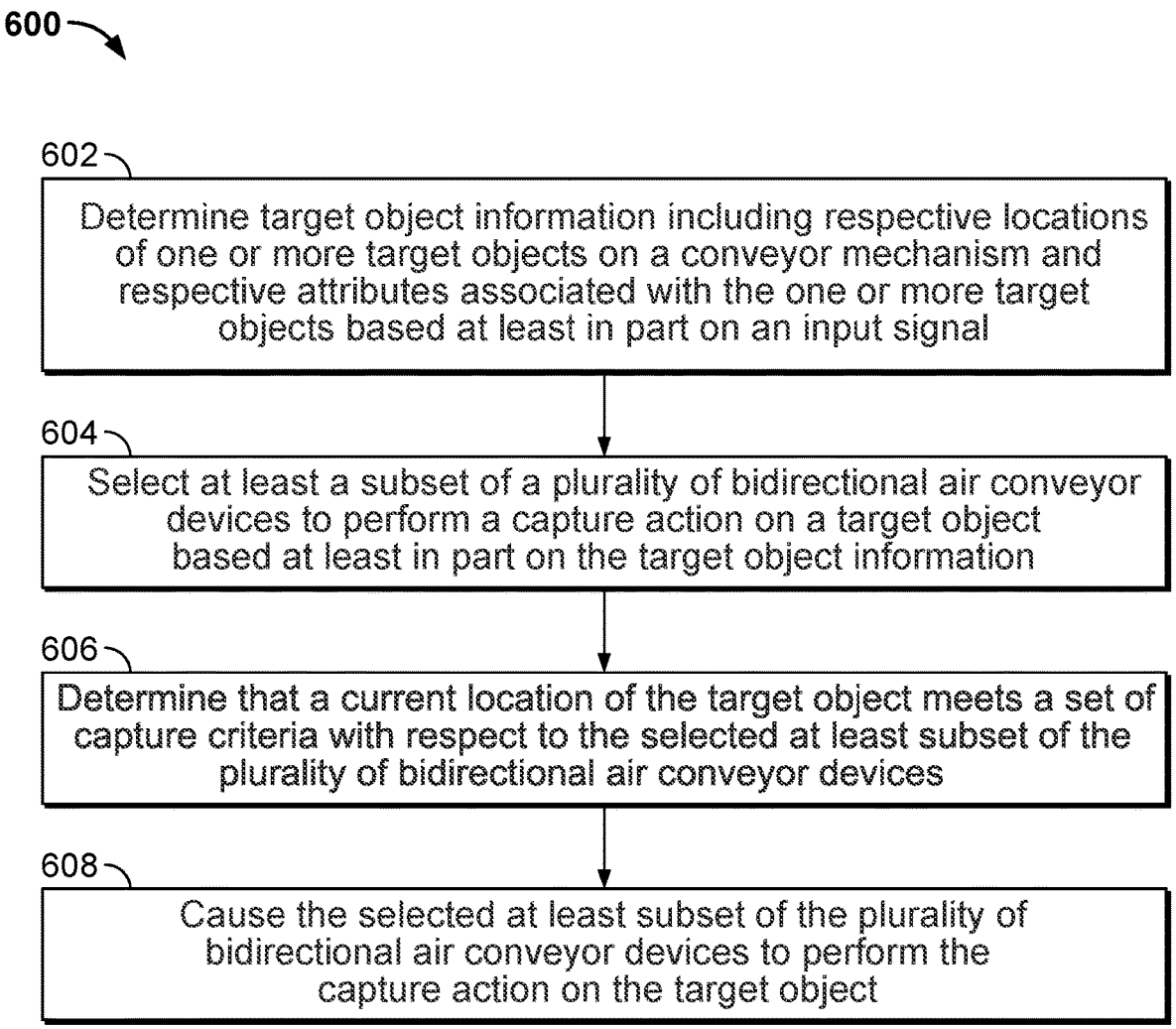
FIG. 6 is a flow diagram showing an example of a process for using a bidirectional air conveyor device to perform a capture action on a target object.

FIG. 6 is a flow diagram showing an example of a process for using a bidirectional air conveyor device to perform a capture action on a target object. In some embodiments, process 600 is implemented by sorting control logic and electronics 160 of FIG. 1. In some embodiments, process 500 of FIG. 5 may be implemented using, at least in part, process 600.

At 602, target object information including respective locations of one or more target objects on a conveyor mechanism and respective attributes associated with the one or more target objects are determined based at least in part on an input signal. For example, based on one more images of objects that are being transported by a conveyor mechanism, those objects that are target objects and their locations on the conveyor mechanism are determined. The attributes of the target objects, such as, for example, the dimensions and material type of the target objects are also determined.

At 604, at least a subset of a plurality of bidirectional air conveyor devices is selected to perform a capture action on a target object based at least in part on the target object information. One or more bidirectional air conveyor devices are selected to perform a capture action on at least one of the identified target objects. In some embodiments, the bidirectional air conveyor device(s) are selected for a target object based on, for example: the location(s) of the bidirectional air conveyor device(s) over the conveyor mechanism, the location of the target object on the conveyor mechanism, the shape(s)/size(s) of the bidirectional air conveyor device(s), the shape/size of the target object, and/or the material type of the target object.

At 606, that a current location of the target object meets a set of capture criteria with respect to the selected at least subset of the plurality of bidirectional air conveyor devices is determined. In some embodiments, the set of capture criteria is that the current location of the target object (on the moving conveyor mechanism) is within a predetermined distance of the location(s) of the selected bidirectional air conveyor device(s) and/or that the current location of the target object has become aligned (within a given margin of error) with the location(s) of the selected bidirectional air conveyor device(s).

At 608, the selected at least subset of the plurality of bidirectional air conveyor devices is caused to perform the capture action on the target object. In response to the determination that the current location of the target object has met the set of capture criteria, an airflow control signal is sent to a pneumatic control system to cause the pneumatic control system to supply pressurized air to a respective air input port of each of the selected bidirectional air conveyor devices. As described above, the supplied pressurized air will allow the selected bidirectional air conveyor devices to emit a vacuum/suction force that will lift the target object off of the conveyor mechanism and towards the selected bidirectional air conveyor devices.

It should be understood that components, elements, and features of any of the embodiments described herein may be used in combination. Moreover, it should be understood that in some embodiments, vacuum sorting system 10 may be used in combination or in conjunction with robotic sorting systems such as those comprising suction grippers. As such, other embodiments are intended to include sorting systems that may comprise both suction grippers and a vacuum extraction assembly as described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A sorting system, comprising:
an object recognition device configured to capture information about one or more objects being conveyed on a conveyor mechanism;
a processor coupled to the object recognition device and configured to:
receive an input signal from the object recognition device;
use the input signal to determine attribute information associated with a target object; and
use the attribute information associated with the target object to send an airflow control signal to a pneumatic control system, wherein the airflow control signal is configured to cause the pneumatic control system to supply an airflow to a bidirectional air conveyor device, wherein the bidirectional air conveyor device is configured to cause the airflow to apply a suction force on the target object to extract the target object, wherein the airflow control signal includes a dynamically determined pressure parameter associated with the airflow, wherein the dynamically determined pressure parameter is determined based at least in part on the attribute information associated with the target object and a speed of the conveyor mechanism; and suction ducting configured to, after the extracted target object passes through the bidirectional air conveyor device, route the target object into a first receptacle, wherein the suction ducting is reconfigurable to route a subsequently extracted object into a second receptacle.

2. The sorting system of claim 1, wherein the object recognition device comprises a camera and wherein the input signal comprises one or more images of the one or more objects, wherein the one or more objects comprise the target object.

3. The sorting system of claim 1, wherein the processor is further configured to select the bidirectional air conveyor device from a plurality of object extraction devices based at least in part on the attribute information associated with the target object.

4. The sorting system of claim 1, wherein the airflow control signal comprises a first airflow control signal, wherein the airflow comprises a first airflow, and wherein the processor is further configured to:
receive a feedback signal from a material obstruction sensor; and
in response to the feedback signal, send a second airflow control signal to the pneumatic control system, wherein the second airflow control signal is configured to cause the pneumatic control system to supply a second airflow to the bidirectional air conveyor device, wherein the second supplied airflow is to eject an obstruction object out of the bidirectional air conveyor device.

5. The sorting system of claim 4, wherein the material obstruction sensor comprises one or more of the following: a pressure sensor, an airflow sensor, an ultrasonic sensor, an infrared sensor, an image sensor, and an opacity sensor.

6. The sorting system of claim 1, wherein the airflow control signal comprises a first airflow control signal, wherein the processor is further configured to:
receive a feedback signal from a material obstruction sensor; and
in response to the feedback signal, send a second airflow control signal to the pneumatic control system, wherein the second airflow control signal is configured to cause the pneumatic control system to stop supplying a first airflow to the bidirectional air conveyor device.

7. The sorting system of claim 6, wherein the material obstruction sensor comprises one or more of the following: a pressure sensor, an airflow sensor, an ultrasonic sensor, an infrared sensor, an image sensor, and an opacity sensor.

8. The sorting system of claim 1, wherein the airflow control signal comprises a first airflow control signal, wherein the airflow comprises a first airflow, and wherein the processor is further configured to:
receive a feedback signal from a material obstruction sensor; and
in response to the feedback signal:
send a second airflow control signal to the pneumatic control system, wherein the second airflow control signal is configured to cause the pneumatic control system to stop supplying the first airflow to the bidirectional air conveyor device; and
send a third airflow control signal to the pneumatic control system, wherein the third airflow control signal is configured to cause the pneumatic control system to supply a second airflow to the bidirectional air conveyor device, wherein the second airflow is to eject an obstruction object out of the bidirectional air conveyor device.

9. The sorting system of claim 1, wherein the airflow control signal comprises a first airflow control signal, wherein the airflow comprises a first airflow, and wherein the processor is further configured to:
receive an indication that an ejection period has elapsed; and
in response to the indication, send a second airflow control signal to the pneumatic control system, wherein the second airflow control signal is configured to cause the pneumatic control system to supply a second airflow to the bidirectional air conveyor device, wherein the second airflow is to eject at least air out of an intake port of the bidirectional air conveyor device.

10. The sorting system of claim 1, wherein the processor is further configured to:
determine that a current location of the target object meets a set of capture criteria with respect to the bidirectional air conveyor device.

11. The sorting system of claim 1, wherein the dynamically determined pressure parameter is determined based at least in part on the attribute information associated with the target object including one or more of the following: a mass of the target object, a size of the target object, and a material type of the target object.

12. The sorting system of claim 1, wherein the dynamically determined pressure parameter associated with the airflow is used to determine an amount of the suction force that will be applied on the target object.

13. A method, comprising:
receiving an input signal from an object recognition device, wherein the object recognition device is configured to capture information about one or more objects being conveyed on a conveyor mechanism;
using the input signal to determine attribute information associated with a target object; and
using the attribute information associated with the target object to send an airflow control signal to a pneumatic control system, wherein the airflow control signal is configured to cause the pneumatic control system to supply an airflow to a bidirectional air conveyor device, wherein the bidirectional air conveyor device is configured to cause the airflow to apply a suction force on the target object to extract the target object, wherein the airflow control signal includes a dynamically determined pressure parameter associated with the airflow, wherein the dynamically determined pressure parameter is determined based at least in part on the attribute information associated with the target object and a speed of the conveyor mechanism,
wherein after the extracted target object passes through the bidirectional air conveyor device, the target object is routed by suction ducting into a first receptacle, wherein the suction ducting is reconfigurable to route a subsequently extracted object into a second receptacle.

14. The method of claim 13, wherein the object recognition device comprises a camera and wherein the input signal comprises one or more images of the one or more objects, wherein the one or more objects comprise the target object.

15. The method of claim 13, further comprising selecting the bidirectional air conveyor device from a plurality of object extraction devices based at least in part on the attribute information associated with the target object.

16. The method of claim 13, wherein the airflow control signal comprises a first airflow control signal, wherein the airflow comprises a first airflow, and further comprising:
receiving a feedback signal from a material obstruction sensor; and
in response to the feedback signal, sending a second airflow control signal to the pneumatic control system, wherein the second airflow control signal is configured to cause the pneumatic control system to supply a second airflow to the bidirectional air conveyor device, wherein the second supplied airflow is to eject an obstruction object out of the bidirectional air conveyor device.

17. The method of claim 16, wherein the material obstruction sensor comprises one or more of the following: a pressure sensor, airflow sensor, ultrasonic sensor, infrared sensor, image sensor, and opacity sensor.

18. The method of claim 13, wherein the airflow control signal comprises a first airflow control signal, and further comprising:
receiving a feedback signal from a material obstruction sensor; and
in response to the feedback signal, sending a second airflow control signal to the pneumatic control system, wherein the second airflow control signal is configured to cause the pneumatic control system to stop supplying a first airflow to the bidirectional air conveyor device.

19. The method of claim 18, wherein the material obstruction sensor comprises one or more of the following: a pressure sensor, an airflow sensor, an ultrasonic sensor, an infrared sensor, an image sensor, and an opacity sensor.

20. The method of claim 13, wherein the airflow control signal comprises a first airflow control signal, wherein the airflow comprises a first airflow, and further comprising:
receiving an indication that an ejection period has elapsed; and
in response to the indication, sending a second airflow control signal to the pneumatic control system, wherein the second airflow control signal is configured to cause the pneumatic control system to supply a second airflow to the bidirectional air conveyor device, wherein the second airflow is to eject at least air out of an intake port of the bidirectional air conveyor device.

* * * * *